Figure 1:
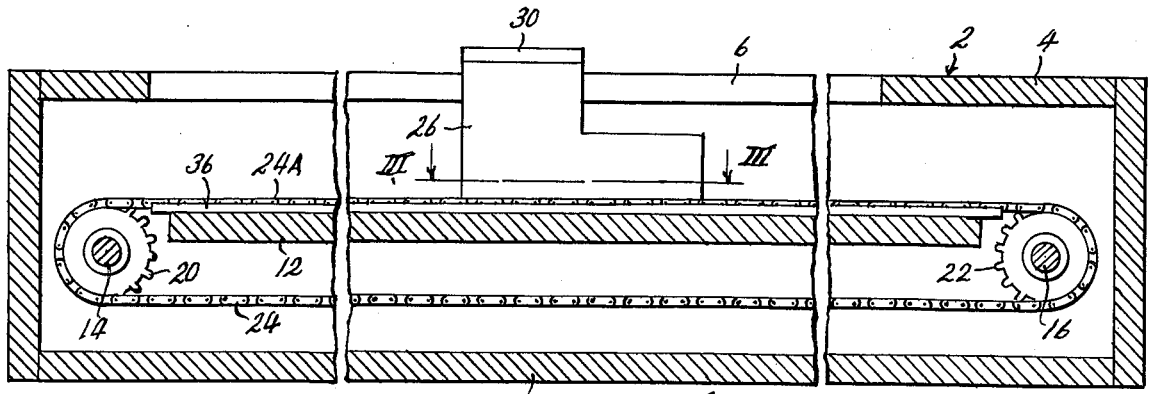

United States Patent [19]

Strickland

[11] 4,082,007
[45] Apr. 4, 1978

[54] CHAIN WITH GUIDE

[76] Inventor: Robert V. Strickland, 9021 Wedd, Overland Park, Kans. 66212

[21] Appl. No.: 695,183

[22] Filed: Jun. 11, 1976

[51] Int. Cl.² .............................................. F16H 7/18
[52] U.S. Cl. ...................................................... 74/240
[58] Field of Search ................................. 74/240, 612

[56] References Cited

U.S. PATENT DOCUMENTS

| | | | |
|---|---|---|---|
| 1,939,862 | 12/1933 | Preble | 198/189 |
| 2,326,165 | 8/1943 | Pelosi | 198/160 |
| 3,921,468 | 11/1975 | Wright | 74/240 |

*Primary Examiner*—Leonard H. Gerin

[57] ABSTRACT

In combination with a sprocket chain trained in a loop around sprockets and having a straight reach having an extending member affixed thereto and adapted to be moved by motion of the chain, a guide consisting of an elongated, fixed track extending along the straight chain reach, and fingers affixed to the chain and slidably engaging the track, interengagement of the track and fingers serving to prevent bodily movement of the chain at the extending member transversely of itself either in the plane of the chain loop or transversely to the chain loop, and to prevent tilting of the chain in the plane of the chain loop responsively to loads applied to the outer end of the extending member affixed to the chain.

2 Claims, 4 Drawing Figures

CHAIN WITH GUIDE

This invention relates to new and useful improvements in chain guides, and has particular reference to situations in which members affixed to straight reaches of sprocket chains are to be accurately moved to any point in a straight line by linear movement of the chain.

Difficulties have arisen in arrangements of this general character, particularly when the member affixed to the chain extends laterally from the chain to any substantial distance, and in its intended usages is loaded at its extended end in a direction transverse to the chain reach to which it is affixed, either in the plane of the chain loop or transversely to said plane. The chain is of course flexible, as it must be to be trained about its driving sprockets, and is therefore movable transversely of itself in the reaches thereof intermediate the sprockets. Especially if the chain reach to which the extending member is affixed is of substantial length, the flexibility of the chain permits it to be deflected laterally of itself by loads applied to the outer end of the extending member. This cannot be permitted in cases where accurate placement of the extending member, or some other element carried thereby, is the basic function of the chain. The deflection of the chain may be in nearly any direction, for example transversely of itself in the plane of the chain loop, transversely of itself transversely to the plane of the chain loop, twisting of the chain about its own axis, or by tilting of the chain section to which the extending member is affixed in the plane of the chain loop. Any of these chain deflections results in a variation of the disposition of the outer end of the extending member relative to any predetermined and preset linear position of the chain itself. It has been found virtually impossible to apply enough tension to the chain to prevent such chain deflections, and it may result in completely unacceptable inaccuracies in the placement and positioning of the extending member.

Accordingly, the primary object of the present invention is the provision of a guiding device to be used in connection with the chain drive system as described, and which is operable to prevent any of the types of chain deflection described above. Depending on the type of deflection it may be desired to prevent, various elements of the guiding device may be used selectively.

Generally, this object is accomplished by the provision of a straight, rigid support disposed against the chain reach inside of the chain loop. This prevents inward deflection of the chain relative to the chain loop. An elongated track member is affixed to the support, having an inverted T-shaped groove in the surface thereof adjacent the chain. The chain rides in the upright leg of the slot, whereby twisting or "cocking" of the chain laterally of the chain loop is prevented. Fingers affixed to the chain at and adjacent the extending element project laterally and slidably into the side legs of the T-slot. This prevents outward deflection of the chain away from the support, and if the fingers are spaced along a sufficient length of the chain, also prevents tilting or "cocking" of the chain in the plane of the chain loop. To prevent twisting of the chain reach around its own axis, an auxiliary guide engaging the extending member itself, in substantially spaced apart relation from the chain, may be employed.

Other objects are simplicity and economy of construction, efficiency and dependability of operation, and adaptability of operation for use in a wide variety of applications.

Figure 2:
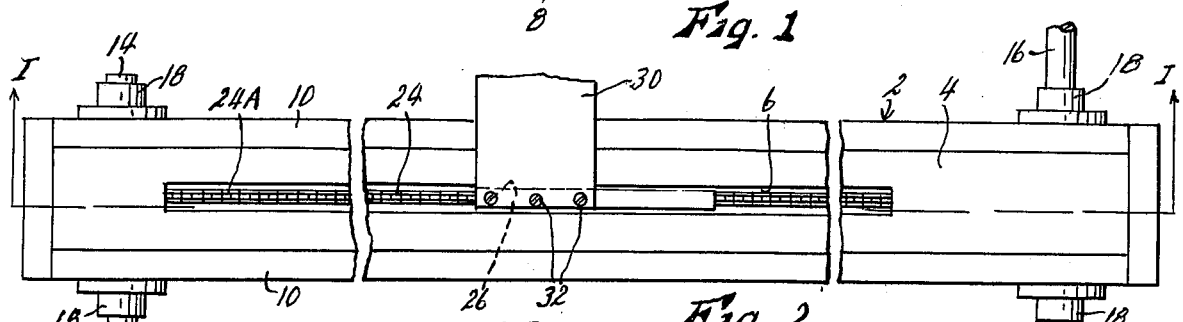
Figure 3:
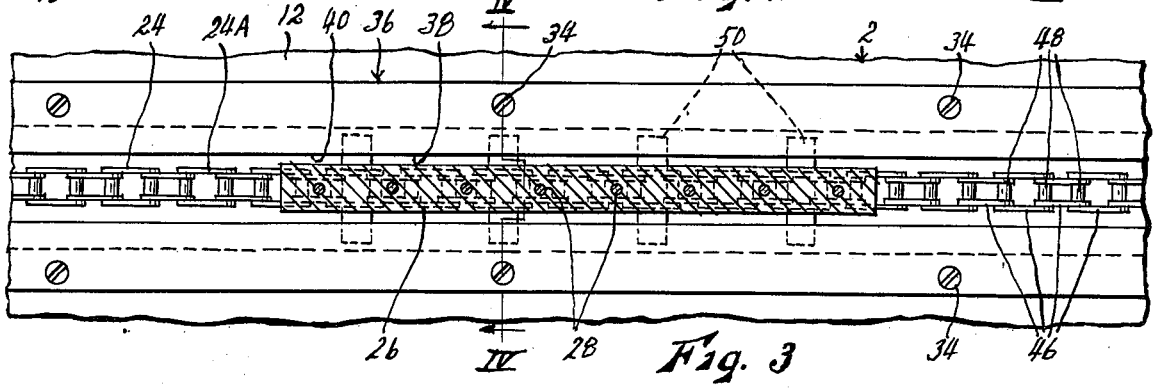
Figure 4:
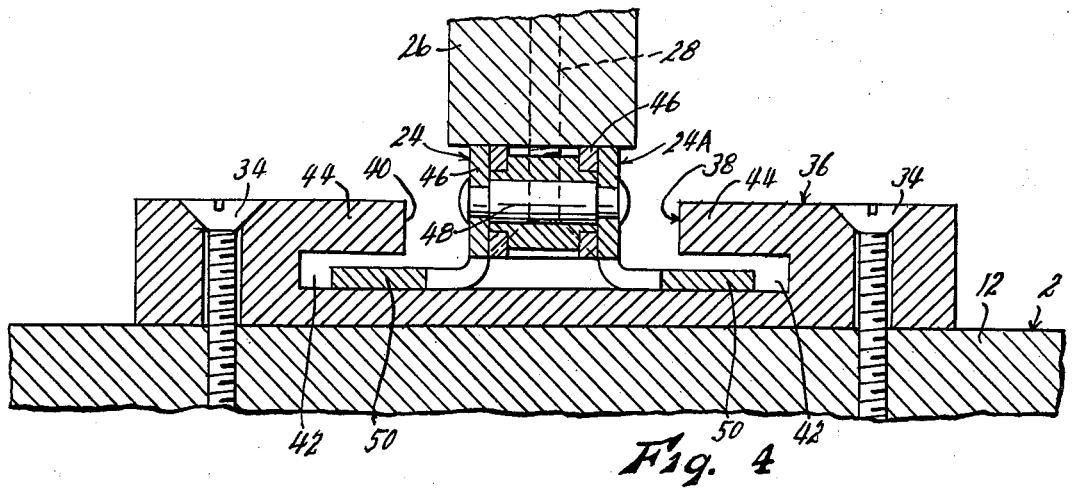

With these objects in view, as well as other objects which will appear in the course of the specification, reference will be had to the accompanying drawing, wherein:

FIG. 1 is a vertical sectional view, partially broken away and foreshortened, of a chain guide device embodying the present invention, being taken substantially on lin I—I of FIG. 2, FIG. 2 is a fragmentary top plan view, also partially broken away and foreshortened, of the device as shown in FIG. 1, FIG. 3 is an enlarged, fragmentary sectional view taken on line III—III of FIG. 1, and FIG. 4 is an enlarged, fragmentary sectional view taken on line IV—IV of FIG. 3.

Like reference numerals apply to similar parts throughout the several views, and the numeral 2 applies generally to a rigid chain "box". Said box is horizontally elongated, having any desired length, and includes a top wall 4 having a slot 6 formed along the longitudinal midline thereof, a bottom wall 8, side walls 10, and a chain support wall 12 which is horizontally disposed intermediate top and bottom walls 4 and 8, is affixed to side walls 10 and which terminates short of both ends of the box.

Adjacent the respective ends of the box are a pair of shafts 14 and 16 which are horizontal, parallel with each other, and extend laterally through side walls 10 of the box, being journalled in bearings 18 fixed to said side walls. Said shafts have sprocket wheels 20 and 22 fixed respectively thereon within the box, and an endless sprocket chain 24 is trained around said sprocket wheels. Shaft 16 is extended outwardly from the box and may be rotatably driven by any suitable means, not shown, whereby to drive the chain. Sprockets 20 and 22 are so disposed that the upper reach 24A of the chain is disposed immediately above and parallel to chain support wall 12 of the box, and is aligned with slot 6 of the top box wall 4, directly therebeneath. An "outwardly extending member" 26, having the function of connecting the chain to any member to be driven or moved by the chain, is affixed to top reach 24A of the chain. Although this member may have many different forms and sizes, depending on the particular usage thereof, as shown it comprises a vertical plate, with its plane disposed in the plane of the chain loop, with its lower edge resting on the chain and affixed thereto as by screws 28. Plate 26 projects upwardly through slot 6 of top box wall 4, for sliding movement therein longitudinally of the box. It may have additional members, such as a horizontal bar 30, affixed to its upwardly extended end as by screws 32.

Affixed to the top surface of support wall 12, as by screws 34, interposed between support wall 12 and top reach 24A of the chain and extending longitudinally thereof, is a track member 36. Said track member constitutes a thin, narrow metal bar having a longitudinal slot 38 of inverted T-shape formed in the top surface thereof. Conveniently and economically, said track could be formed of extruded aluminum or the like. Slot 38, as best shown in FIG. 4, has an upright leg 40 within which the top chain reach 24A rests slidably, and a pair of laterally projecting legs 42 extending outwardly in both directions from upright leg 40, being undercut beneath the top of the track so that the track forms arms 44 overlying slot legs 42. Chain 24 is formed of rigid links 46, contiguous links being pivotally joined by pivot pins 48. In accordance with the present invention, certain of links 46 along the length of the lower edge of extending member 26 are provided with angled fingers 50 at each side thereof, said fingers projecting into lateral legs 42 of slot 38, and are retained therein for sliding movement longitudinally of the chain. Sprocket chains of this type, and those containing links with fingers 50, are common and well known in the art, although the fingers are usually utilized for attaching objects to a moving chain.

In the operation of the device, it will be understood first that extending member 26, and bar 30 affixed thereto, are moved by the movement of chain 24 when said chain is driven by sprocket 22, and that accuracy of the positioning of member 26, or anything carried thereby, will be destroyed by any deflection, twisting or "cocking" of the chain, whenever said position is referenced to the linear position of the chain itself. This inaccuracy is increased when member 26 extends laterally of the chain to any substantial distance, or when member 26 is subjected to substantial loading, or when the chain itself is comparatively slack. It has been found to be virtually impossible to stretch the chain sufficiently tight that the outer end of member 26 can be accurately indexed to the linear position of the chain if member 26 extends very far from the chain, or carries any substantial load, due to deflection, twisting or cocking of the chain.

The present device prevents any of these occurrences. The presence of track 36 beneath chain reach 24A braces the chain, and hence member 26, against any downward deflection in the plane of the chain loop, regardless of any load exerted at the outer end of member 26 in that direction. The inclusion of chain reach 24A in the upright leg 40 of track T-slot 38 prevents movement of the chain reach laterally of the plane of the chain loop. While slot leg 40 is shown somewhat wider than the chain width, for the purpose of rendering the chain free-running in the slot, it may be made as narrow as desired, depending on the degree of accuracy of control desired or necessary. The upright leg 40 of the slot also prevents lateral cocking of the chain section affixed to member 26 in a plane transverse to the chain loop, in the event a torsional strain is applied to the outer end of member 26 in that plane. The inclusion of chain fingers 50 in legs 42 of track slot 38 prevents the chain from being deflected outwardly in the plane of the chain loop, in the event a lifting force is applied to member 26, and also prevents tilting or cocking of the chain section affixed to member 26 in the event a force parallel to the chain is applied to the outer end of member 26. In the event a force acting laterally of the chain loop is applied to the outer end of member 26, fingers 50 also tend to prevent twisting of chain reach 24A about its own longitudinal axis. However, since fingers 50 must have some vertical clearance in slot legs 42 for free-running, which would permit at least a small degree of twisting of the chain in these circumstances, and since the lateral movement of the outer end of member 26 would be increased and multiplied if the extension of said member from the chain were substantial, such lateral movement is further limited by the extension of member 26 through slot 6 of top wall 4 of box 2.

While I have shown and described a specific embodiment of my invention, it will be readily apparent that many minor changes of structure and operation could be made without departing from the spirit of the invention.

What I claim as new and desire to protect by Letters Patent is:

1. In combination with an endless flexible sprocket chain trained about two or more sprocket wheels and driven linearly by said sprocket wheels, said chain having a normally straight reach between a pair of consecutive sprocket wheels to which is affixed a member extending laterally from said chain, a guiding device operable to insure that the extended end of said extending member may be accurately indexed to the linear position of said chain, said guiding device comprising:
   a. a fixed, straight guide member extending along said straight chain reach in parallel closely spaced relation thereto, the surface of said guide member confronting said chain being disposed transversely to the plane of the loop formed by said chain, whereby transverse deflection of said straight chain reach in the plane of the chain loop, toward said guide member, is prevented,
   b. means interconnecting a section of said chain, including the point thereof to which said extending member is affixed, to said guide member, said interconnecting means being operable to permit longitudinal sliding movement of said chain relative to said guide member, but to prevent movement of said chain reach transversely of itself in a direction away from said guide member, and also to prevent canting or cocking of the portion of the chain to which said extending member is affixed, both in the plane of said chain loop and also in a direction transverse to the plane of said chain loop, projecting to a substantial distance laterally from said straight chain reach, and
   c. a second fixed guide member spaced substantially apart from said straight chain reach and having a slot formed therein parallel to said straight chain reach, said extending member projecting through and being disposed for longitudinal sliding movement in said slot.

2. The structure as recited in claim 1 wherein a substantial length of said straight chain reach is rendered rigid and inflexible by the affixation of said extending member thereto, wherein said guide member has a slot of inverted T-shape formed longitudinally therein, said slot having a base leg lying in the plane of the chain loop and in which said straight chain reach is disposed for longitudinal sliding movement, and a pair of cross bar legs extending laterally in both directions from said base legs, and wherein said interconnecting means comprises a plurality of fingers affixed to the rigid portion of said chain, in longitudinally spaced relation along said rigid portion, said fingers projecting laterally of said chain in both directions, laterally of the plane of said chain loop, and being slidable engaged in the cross bar legs of said T-slot of said guide member.

* * * * *